Patented May 17, 1938

2,117,591

UNITED STATES PATENT OFFICE 2,117,591

VULCANIZATION OF PLASTIC PRODUCTS

Claude H. Alexander, Cuyahoga Falls, Ohio, assignor to The B. F. Goodrich Company, New York, N. Y., a corporation of New York No Drawing. Application April 17, 1937,
Serial No. 137,587

9 Claims. (Cl. 106—22)

This invention relates to the vulcanization of plastic products, and has for its object the vulcanization of saturated or unsaturated polymeric plastics containing reactive halogen.

I have discovered that by heating a polymeric plastic containing reactive halogen in the presence of an aldehyde-amine condensation product, the properties of the plastics undergo changes similar to the changes in the properties of rubber when it is vulcanized. Since the exact mechanism of the reaction is not understood except to the extent that hydrogen chloride is evolved during vulcanization, probably giving cross-linked polymeric molecules, I refer to it as vulcanization without binding myself to any theory as to the nature of the process. In general, the solubility and thermoplasticity of the plastics are decreased, the tensile strength is increased, and the elongation is often increased by this vulcanization process. The vulcanized products are usually harder, especially when a large amount of vulcanizing agent is used.

The plastics which are vulcanizable by the method of this invention are saturated or unsaturated polymeric products containing reactive halogen. By the term "reactive halogen" I mean that the products contain halogen which is split off as a hydrogen halide when heated with the vulcanizing agents of this invention. Such plastics include polyvinyl halides, polyvinyl halogenated organic esters such as polyvinyl chloracetate, polymerized chloroprene (chloro-2-butadiene-1,3) which is commercially known as "Neoprene", chlorinated rubber, and other polymeric halogen-containing compounds.

The vulcanizing agents are the condensation products of an aliphatic aldehyde and an aromatic amine. The aliphatic aldehydes which may be used include formaldehyde, acetaldehyde, aldol, propionaldehyde, butyraldehyde, etc. The aromatic amines include such typical compounds as aniline, ortho, meta, and para toluidine, para phenylene diamine, alpha and beta naphthylamine, etc. Several different compounds may be obtained from the condensation of an aldehyde and an amine by varying the proportions of the reactants and the reacting conditions.

Though the composition of many of the condensation products which accomplish the vulcanization is unknown, it is believed that they all contain open-chain compounds. By the term "open-chain compounds" as used in the appended claims, I mean compounds in which the nitrogen atoms do not enter into a ring. Thus open-chain compounds may contain benzene rings, naphthalene rings, etc., but according to my definition, such compounds as pyridine, pyrrole, and quinoline are not open-chain compounds. By-products of the condensation which are heterocyclic compounds containing a nuclear nitrogen atom, such as the quinoline-type compounds, are not useful as vulcanizing agents. The condensations should be controlled, if possible, to inhibit the formation of these products. A most satisfactory vulcanizing agent may be obtained by condensing one mol. of aniline with an excess over three mols of butyraldehyde, distilling off unreacted raw materials, and extracting by-product quinoline derivatives with acid, to produce a compound which is believed to be 1-phenylimino-2,4-diethyl-octadiene-2,4.

The properties of the vulcanized product depend upon the temperature and length of vulcanization and somewhat upon the quantity of vulcanizing agent used. Compositions containing 10% of a vulcanizing agent are usually stiffer and harder than compositions containing from 2% to 5%. I usually prefer to use from .5% to 10% of vulcanizing agent, though greater and less amounts may be used. The vulcanization reaction resembles the vulcanization of rubber in that the best results are secured at an optimum cure, overcuring producing a decrease in tensile strength and elongation.

The action of the vulcanizing agent is often very rapid, and unless carefully controlled, it may result in brittle products having little practical value. Light-colored plastics have a tendency to darken under the influence of the liberated hydrogen halides. For these reasons, I usually include in the composition a stabilizer which prevents the reaction from proceeding too rapidly and lessens or obviates the tendency to darken. The silicates of the alkali and alkaline earth metals and the alkaline earth oxides are all excellent stabilizers. They should be used in relatively large quantities where long cures or service at high temperatures are contemplated, since the hydrogen halides which are liberated react with them to form metallic halides, thereby diminishing their stabilizing effects.

It is well known that gamma polyvinyl chloride may be plasticized to form very useful, easily molded, rubbery compositions. These compositions soften at low temperatures, however, and are rarely useful above 70° C. To illustrate the effect obtained by the vulcanization of my invention, I prepare a typical plasticized polyvinyl chloride composition containing polyvinyl chloride 100 parts by weight and tricresyl phosphate 100 parts. To one portion I add 4 parts of 1-phenylimino-2,4-diethyl-octadiene-2,4 and calcium silicate 5 parts. I cure both compositions in a press for 20 minutes at 297° F. At the end of the cure, the vulcanized stock is tenacious and is easily separated from the hot mold, but the sample containing no vulcanizing agent is a viscous molten mass and must be cooled before it can be removed from the mold. When a small piece of each stock is placed on a tight mill at 150° F., the unvulcanized stock easily knits together into a sheet. The vulcanized stock, being non-thermoplastic, crumbles into a fine powder. To make an unvulcanized stock of the same hardness as the vulcanized stock the proportion of plasticizer must be reduced from 100 parts to approximately 75 parts.

Clay, barytes, zinc oxide, wood flour, and other pigments and fillers commonly used in the rubber and plastics industries may also be included in the compositions. Carbon black is an especially useful pigment, for it often affects the vulcanization to greatly increase the strength of the compositions. The tensile strength of a composition containing polyvinyl chloride 100 parts by weight, tricresyl phosphate 100 parts, 5 parts of 1-phenylimino-2,4-diethyl-octadiene-2,4, and magnesium oxide 5 parts is twenty per cent. greater after cure if 5 parts or carbon black are incorporated therein before curing.

This vulcanization may also be carried out in solution. This is a particularly useful method of preparing non-thermoplastic protective coatings. Plasticized polyvinyl chloride containing a vulcanizing agent is dissolved in warm chlortoluene. Before vulcanization starts, the solution is painted or sprayed upon any desired surface. By heating sufficiently, the solvent evaporates and vulcanization occurs, thereby forming a flexible, non-thermoplastic film having great resistance to oxidation and solvents.

In another experiment, I prepared tensile sheets of polychloroprene 100 parts; polychloroprene 98 parts and magnesium oxide 2 parts; and polychloroprene 96 parts, 2 parts of 1-phenylimino-2,4-diethyl-octadiene-2,4, and magnesium oxide 2 parts. After curing for 15 minutes at 260° F., the polychloroprene and polychloroprene containing magnesium oxide were soft sticky masses on which it was impossible to determine the tensile strength. The vulcanized stock, however, had a tensile strength of 1470 lbs. per sq. in. and an elongation of 815%. A stock containing polychloroprene 98 parts, 1 part of 1-phenylimino-2,4 diethyl-octadiene-2,4, and magnesium oxide 1 part gave the remarkably high tensile of 2036 lbs. per sq. in. and elongation of 1005% after cure. Other compounds such as the condensation products of para phenylene diamine and butyraldehyde, of aldol and alpha naphthylamine, and many other conjugated dienes and trienes formed by an aldehyde-amine condensation produce similar vulcanization reactions with polychloroprene, polyvinyl chloride, or any of the other plastics containing reactive halogen.

While I have herein disclosed specific embodiments of my invention, I do not limit myself wholly thereto, for it will be obvious to anyone skilled in the art that many modifications including substituting equivalent materials and varying the amounts of materials used are within the spirit and scope of the invention defined in the appended claims.

I claim:

1. The method which comprises heating a polyvinyl halide with a condensation product of an aliphatic aldehyde with an aromatic amine, which product contains at least one open-chain compound.

2. The method which comprises heating plasticized polyvinyl chloride with a condensation product of butyraldehyde and aniline, which product contains at least one open-chain compound.

3. The method which comprises mixing completely polymerized polyvinyl chloride with a plasticizer and a small proportion of 1-phenylimino-2,4-diethyl-octadiene-2,4, and heating.

4. The method which comprises mixing completely polymerized polyvinyl chloride with a plasticizer, a stabilizer, carbon black, and a small proportion of 1-phenylimino-2,4-diethyl-octadiene-2,4, and heating.

5. A composition resulting from the heat reaction of polyvinyl chloride with a condensation product of an aliphatic aldehyde and an aromatic amine, which product contains at least one open-chain compound.

6. A composition resulting from the heat reaction of plasticized polyvinyl chloride with a condensation product of butyraldehyde and aniline, which product contains at least one open-chain compound.

7. A composition resulting from the heat reaction of plasticized polyvinyl chloride with 1-phenylimino-2,4-diethyl-octadiene-2,4.

8. The method which comprises heating a polyvinyl halide with a condensation product of butyraldehyde and para phenylene diamine, which product contains at least one open-chain compound.

9. The method which comprises heating a polyvinyl halide with a condensation product of aldol and naphthylamine, which product contains at least one open-chain compound.

CLAUDE H. ALEXANDER.